(12) United States Patent
Layukallo

(10) Patent No.: US 6,484,971 B2
(45) Date of Patent: Nov. 26, 2002

(54) CONTROL OF FLOW SEPARATION AND RELATED PHENOMENA ON AERODYNAMIC SURFACES

(76) Inventor: Thombi Layukallo, 5-11-105 Komagata-cho, Showa-ku, Nagoya 466-0832 (JP)

( * ) Notice: Subject to any disclaimer, the term of this patent is extended or adjusted under 35 U.S.C. 154(b) by 0 days.

(21) Appl. No.: 09/748,255

(22) Filed: Dec. 27, 2000

(65) Prior Publication Data

US 2002/0079405 A1 Jun. 27, 2002

Related U.S. Application Data

(60) Provisional application No. 60/220,219, filed on Jul. 24, 2000.

(51) Int. Cl.[7] .................. B64C 1/38; B64C 23/06; B64C 21/10; B64C 21/00
(52) U.S. Cl. .................. 244/130; 244/199; 244/200; 244/204
(58) Field of Search .................. 244/35 R, 198–200, 244/204, 130

(56) References Cited

U.S. PATENT DOCUMENTS

| 3,184,186 | A | | 5/1965 | Ikai et al. |
| 3,578,264 | A | * | 5/1971 | Kuethe .................. 244/130 |
| 3,937,594 | A | * | 2/1976 | Ito et al. .................. 244/35 R |
| 4,522,360 | A | * | 6/1985 | Barnwell et al. .......... 244/204 |
| 4,619,423 | A | | 10/1986 | Holmes et al. |
| 4,750,693 | A | | 6/1988 | Löbert et al. |
| 5,037,044 | A | * | 8/1991 | Seyfang .................. 244/199 |
| 5,058,837 | A | * | 10/1991 | Wheeler .................. 244/199 |
| 5,133,519 | A | | 7/1992 | Falco |
| 5,209,438 | A | | 5/1993 | Wygnanski |
| 5,505,409 | A | | 4/1996 | Wells et al. |
| 5,540,406 | A | | 7/1996 | Occhipinti |
| 5,730,393 | A | | 3/1998 | Hatrick et al. |
| 5,755,408 | A | | 5/1998 | Schmidt et al. |
| 5,772,155 | A | * | 6/1998 | Nowak .................. 244/199 |
| 5,806,807 | A | * | 9/1998 | Haney .................. 244/130 |
| 5,860,626 | A | | 1/1999 | Moser |
| 5,909,782 | A | * | 6/1999 | Pluff et al. |
| 5,961,080 | A | | 10/1999 | Sinha |
| 5,971,326 | A | * | 10/1999 | Bechert .................. 244/130 |
| 5,983,944 | A | | 11/1999 | Niv |
| 6,105,904 | A | * | 8/2000 | Lisy et al. .................. 244/130 |
| 6,109,565 | A | * | 8/2000 | King, Sr. .................. 244/207 |
| 6,109,567 | A | * | 8/2000 | Munoz Saiz .................. 244/215 |
| 6,123,296 | A | | 9/2000 | Mangalam |

FOREIGN PATENT DOCUMENTS

| GB | 284187 A1 | * | 9/1988 | .................. 102/130 |
| JP | 1927-790 | | 4/1927 | |
| JP | 56-86891 | | 7/1981 | |
| JP | 5-16892 | * | 1/1993 | .................. 102/130 |

* cited by examiner

Primary Examiner—Charles T. Jordan
Assistant Examiner—Lulit Semunegus
(74) Attorney, Agent, or Firm—Antonelli, Terry, Stout & Kraus, LLP

(57) ABSTRACT

Method and apparatus for suppressing fluid flow separation from a surface of a body during flow of a fluid along the surface of the body. At least one barrier member (for example, at least one tab) is provided extending away from the surface of the body and into a separated flow region adjacent the body surface, but not into a smooth flow region beyond the separated flow region. Where a plurality of barrier members are used, the barrier members are located spaced from each other along the direction of flow of the fluid. The barrier member suppresses upstream movement of the separation point between smooth flow along the body surface and separated flow. A chamber extending from the body surface and into the body can be positioned at the barrier member, to provide a place for vortices in the fluid flow to settle down. The barrier member can be moved from a position where it is co-planar with the body surface to a position where it extends away from the surface into the separated flow region.

18 Claims, 10 Drawing Sheets

FIG. 1
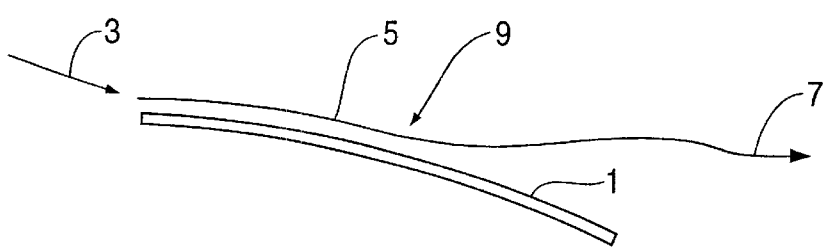
FIG. 2(a) FIG. 2(b)
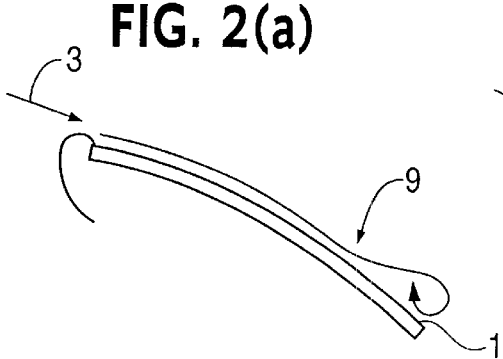 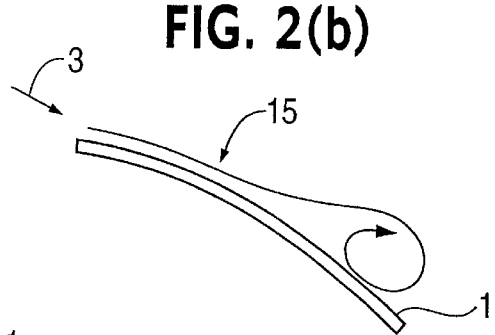
FIG. 3
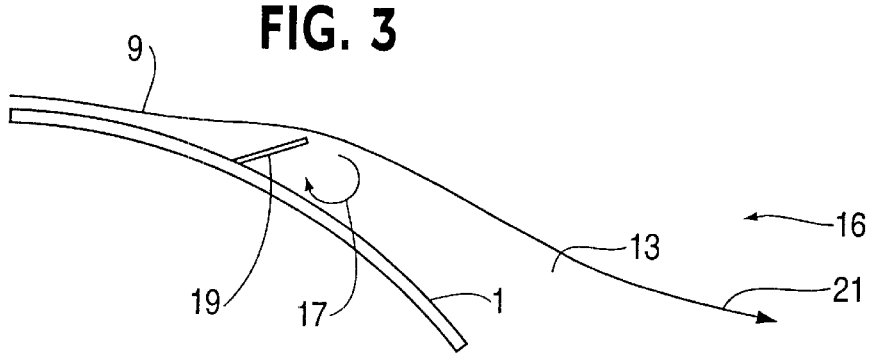

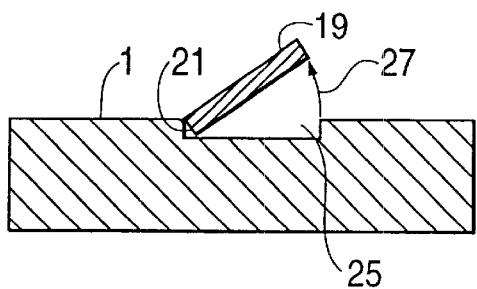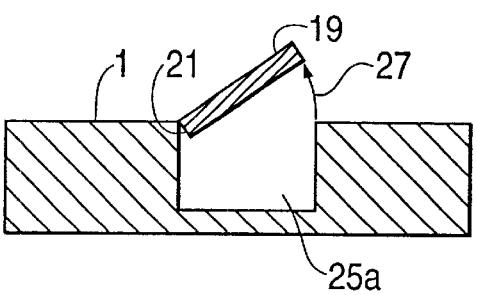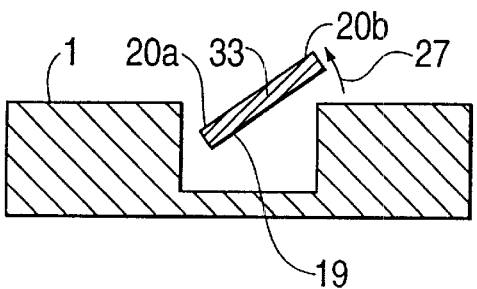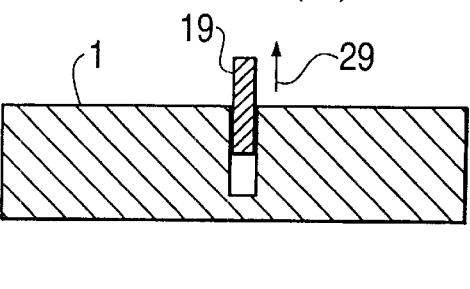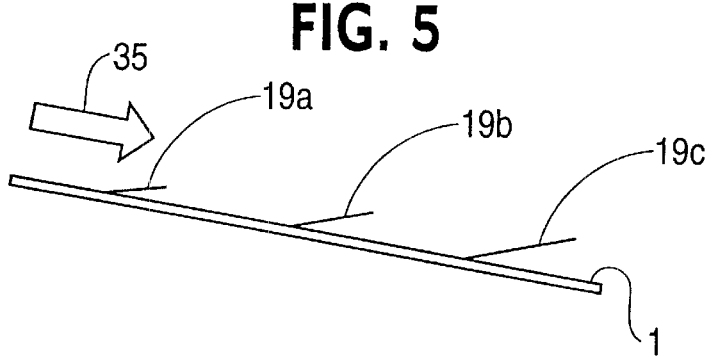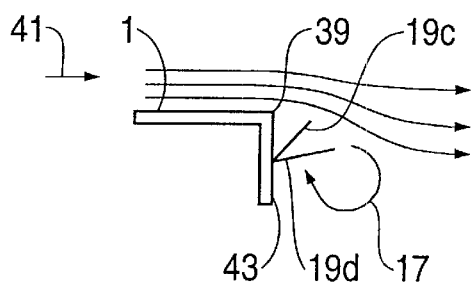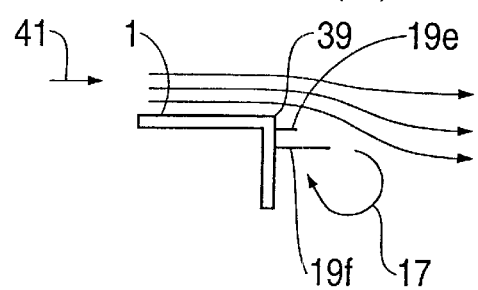

No tab

Single

Multi tab

CONTROL OF FLOW SEPARATION AND RELATED PHENOMENA ON AERODYNAMIC SURFACES

This application claims priority under 35 USC 119(e)(1) of provisional application Serial No. 60/220,219, filed Jul. 24, 2000.

BACKGROUND OF THE INVENTION

The present invention is directed to a method, and structure, which suppresses separation of fluid (e.g., gas or liquid, such as air) flow adjacent a surface of a body when passing the fluid along an exterior surface of the body, such as in the case of a fluid flowing across the wing of an airplane, or when passing the fluid along an interior surface of the body, such as in the case of a fluid flowing in a diffuser along a surface of the diffuser. In particular, the present invention is directed to a method, and structure, wherein instabilities or oscillations associated with separation of fluid flow adjacent the surface of the body is suppressed, and drag associated with this fluid flow separation is suppressed.

It is well known in fluid dynamics that when a fluid passes along a solid body, the fluid will form a viscous layer, known as a "boundary layer", adjacent the body surface. This boundary layer possesses a much lower energy level than the flow outside it. Inside the boundary layer, the flow is distorted under viscous effects and there exists a large velocity gradient in the direction normal to the body surface.

When a large adverse pressure gradient exists, that is, when pressure increases in the direction of the fluid flow, the boundary layer may not be able to tolerate the pressure gradient, and will start to separate from the body surface, as schematically illustrated in FIG. 1. Thus, shown in FIG. 1 is surface 1 of the body, having fluid flow adjacent surface 1. The flow is shown schematically by reference character 3, and includes, initially, flow adjacent surface 1 of the body (attached flow, e.g., in an attached boundary layer flow region), shown by reference character 5, and separated flow, e.g., in separated boundary layer flow region shown by reference character 7, where the flow is separated from surface 1 of the body. The separation point, where the flow initially separates from the body, is shown by reference character 9 in FIG. 1. This point is defined as the point where the velocity gradient in the direction normal to the body surface is observed for the first time to be continuously less than or equal to zero.

FIGS. 18(a) and 18(b) respectively show, in more detail (with respect to fluid flow) than shown in FIG. 1, such separation from an external surface 1 of a body 2 (e.g., an airplane wing) and from an internal surface 1a of a body 2a (e.g., a diffuser). This phenomenon is called "flow separation", or "separation". Shown in FIG. 18(a) is separation point 9, where the fluid first separates from surface 1 of body (airfoil) 2. Downstream from the separation point 9, in the direction of fluid flow, the fluid exhibits separated flow in a separated flow region 13 (separated boundary layer flow region), where the fluid flow forms eddies 17. Even downstream of separation point 9, in regions spaced from surface 1 or 1a of the body of the fluid exhibits smooth flow, e.g., smooth outer flow, in smooth outer flow regions 16 shown in each of FIGS. 18(a) and 18(b). The separated boundary layer flow region is defined as the region in which the local flow velocity is directed essentially in the direction opposite to the direction of the main flow prior to the separation point. This is compared to the smooth flow region (smooth outer flow region), which is the flow region outside (relative to the body) the separated boundary layer flow region.

Moreover, as the fluid flow continues over time this flow separation propagates upstream from an initial separation point, as seen in FIGS. 2(a) and 2(b), and as shown in more detail with respect to fluid flow patterns in FIGS. 19(a) and 19(b). That is, FIG. 2(a) shows an initial stage of fluid flow, and FIG. 2(b) shows a later stage (later in time). At the initial stage, separation point 9 is toward the rear end of surface 1 of the body, with respect to fluid flow direction 3. At a later time, separation point 15 has moved upstream, as shown in FIG. 2(b). And, as shown in FIG. 19(a) disturbance waves 11 propagate upstream from inside the separated flow region 13, exerting influences on the upstream flow region. Separated flow region 13 is extended upstream, so that separation point 9 changes to an "adjusted" separation point 15, as shown in FIG. 19(b).

In almost all cases, flow separation is associated with disadvantages, and is therefore to be avoided. If the body is the wing of an airplane, flow separation may cause the airplane to lose its lifting force, a situation known as "stall". Flow separation also increases the drag force acting on the wing, which is particularly disadvantageous when the airplane is in a cruise condition. If separation occurs inside a diffuser, the diffuser loses its diffusing ability.

In many cases, flow separation also leads to the occurrence of unsteady phenomena, which may cause control problems. Aerodynamic unsteadiness could alternately lead to structural failure of the body in question. This is particularly true for an airplane flying in the flow regime known as the "transonic" regime, or maneuvering a landing approach, where a phenomenon known as "buffeting" can arise due to flow separations. Flow separation also often leads to other interfering phenomena, such as the disturbing wind noises around transport vehicles, or the noise interference to electrical/power transmissions through cables/power lines.

In the transonic regime, where the flow speed is close to the speed of sound, separation induced flow oscillations (usually in conjunction with the formation of shock-waves) can be very severe. One method that has been proposed to stop these oscillations is disclosed in U.S. Pat. No. 5,692,709 to Mihora and Cannon. In this particular patent a method is described in which flow oscillations are stopped by fixing simple devices at prescribed positions on the surface of the aerodynamic body. These devices force shock-waves to form prematurely at fixed locations, which are the locations of these devices.

In addition to the foregoing, many other methods have been proposed to suppress flow separation under specific flow conditions. These include, but are not limited to, vortex generators (such as disclosed in U.S. Pat. No. 5,253,828 to Cox), riblets (such as disclosed in U.S. Pat. No. 4,863,121 to Savill), large-eddy break-up devices, porous or slotted walls, fluid blowing and/or suction, moving surfaces, actuators (such as disclosed in U.S. Pat. No. 5,209,438 to Wygnanski), vibrating flexible structure (such as U.S. Pat. No. 5,961,080 to Sinha), and stepped body surfaces.

As mentioned previously, flow separation is associated with the existence of vortical structures (eddies) 17, of various sizes, inside separated flow region 13, as shown in FIGS. 18(a) and 18(b). These eddies 17 give rise to disturbance waves 11 (see FIG. 19(a)), which can travel in the upstream direction. The disturbance information in the disturbance waves 11 is received by the flow upstream of the original separation point. The flow will adjust itself to this information, and the separation point is shifted upstream, until some kind of balance (e.g., steady-state) is achieved. This adjustment of original separation point 9 to adjusted separation point 15 (see FIG. 19(*b*)), at an upstream location from original separation point 9 due to this disturbance information, has been previously mentioned. In the case that the disturbances are large, the whole flow field is said to be "unsteady", and the point of separation fluctuates about a mean position. The flow field then constitutes a feed-back system.

As mentioned previously, on the surface of the body the fluid particles form a very thin viscous layer, known as the "boundary layer". Because flow inside the boundary layer is mostly much slower than the flow outside it, it is easier for disturbances to travel inside this layer. In the case that the flow outside the boundary layer is supersonic, upstream propagation can occur only inside the boundary layer. Therefore, preventing the disturbances from propagating upstream inside the boundary layer is important in controlling flow separation, especially in high-speed flows.

SUMMARY

The present invention is intended to lessen this upstream propagation or upstream influences of disturbances that originate inside the separated flow region. It is meant not only to reduce drag associated with the flow separation, but also suppress the instabilities or oscillations associated with the flow separation. The method and structure of the present invention involve, as an illustrative embodiment, providing a barrier member (for example, a tab), or a plurality of barrier members (e.g., a plurality of tabs), on the body surface, each barrier member acting as a physical barrier extending away from the surface of the body, and which prevents the upstream propagation of the disturbances, as illustrated schematically in FIG. 3, and prevents upstream influences of the disturbances.

That is, FIG. 3 shows schematically barrier member (tab) 19 according to the present invention. Barrier member 19 blocks upstream propagation of disturbances, for example, those disturbances excited by eddies 17.

As can be seen from FIG. 3, barrier member 19 in FIG. 3 extends from surface 1 of the body into separated flow region, but does not extend beyond edge 21, the boundary of separated flow region 13, into smooth flow region 16. That is, in the absence of barrier member 19, there is a separated flow region 13 adjacent surface 1 of the body and smooth flow region 16 outside separated flow region 13 (with respect to surface 1). According to the present invention, the at least one barrier member extends into this separated flow region absent the barrier member, but not into the smooth flow region.

Due to barrier member 19 blocking upstream propagation of disturbances originating in separated flow region 13, separation point 9 is maintained substantially without moving upstream. This barrier member 19 penetrates into the separated flow region 13, but not into the outer, smooth flow region 16. The length and angle of deflection of barrier member or members 19, with respect to surface 1 of the body, can be varied according to the severity of the separation.

Thus, the present invention involves converting part of the surface affected by the fluid flow separation, from an originally smooth surface into one having barrier members, e.g., barrier members such as steps, tabs, etc. These steps, tabs, etc., act as barriers that prevent upstream propagation, or upstream influences, of disturbances. If the steps, tabs, etc. are kept within the separated region, they would not interfere with the outer, smooth flow.

BRIEF DESCRIPTION OF THE DRAWINGS

FIG. 1 schematically illustrates fluid flow along a body surface, for illustrating separated flow.

FIGS. 2(*a*) and 2(*b*) illustrate movement of the separation point at which flow separates from a body surface, to upstream of an original separation point, showing separation points respectively at initial and later stages of fluid flow.

FIG. 3 schematically illustrates an embodiment of the present invention, having a barrier member extending from a body surface into a separated flow region.

FIGS. 4(*a*)–4(*d*) are cross-sectional views showing movable barrier members according to various embodiments of the present invention.

FIG. 5 illustrates schematically an embodiment according to the present invention wherein a plurality of barrier members, spaced along the direction of fluid flow, are provided to prevent upstream propagation of disturbances.

FIGS. 6(*a*) and 6(*b*) show various embodiments according to the present invention wherein the body surface has a sharp corner, and different barrier member configurations being provided on the body surface.

DETAILED DESCRIPTION

Figure 7:
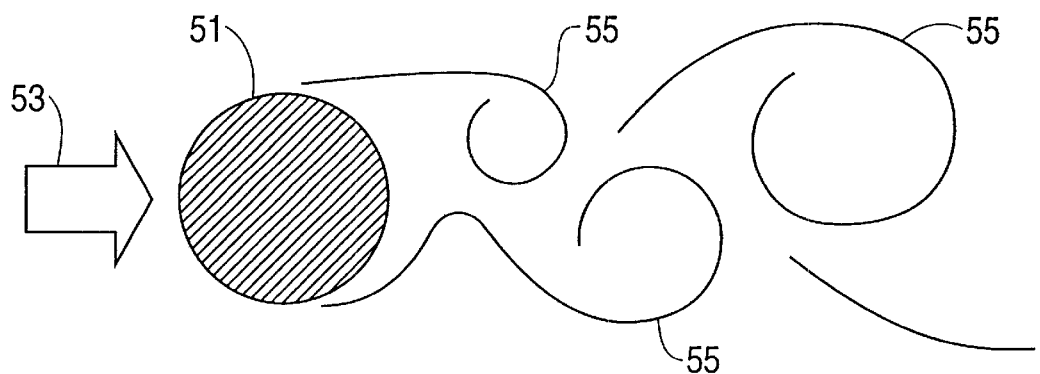
FIG. 7 shows vortex generation with fluid flow perpendicular to a tangent of a cylinder as the body.

While the present invention will be described in connection with specific embodiments, it will be understood that it is not intended to limit the invention to those embodiments. To the contrary, it is intended to cover all alterations, modifications and equivalents as may be included within the spirit and scope of the invention as defined by the appended claims.

Throughout the present disclosure, where methods are described as including or comprising specific processing steps, and where apparatus is described as including or comprising specific components, it is contemplated by the inventor that the methods of the present invention also consist essentially of, or consist of, the recited processing steps, and that the apparatus of the present invention also consists essentially of, or consists of, the recited components. Accordingly, throughout the present disclosure, any of the described methods can consist essentially of, or consist of, the described processing steps, and any of the described apparatus can consist essentially of, or consist of, the described components.

Throughout the present disclosure, including the various drawing figures, common components can be designated by the same reference characters.

The present invention is directed, in general, to a method of suppressing separation of fluid flow adjacent a surface of a body, during flow of a fluid along the surface of the body; and structure having suppressed separation of fluid flow adjacent the surface of the body, during flow of the fluid along the surface of the body. Fluid flow along the surface of the body includes (1) a smooth flow region, spaced from the surface of the body, and (2) a separated flow region between the surface of the body and the smooth flow region, and the method according to the present invention includes providing the surface of the body with at least one barrier member, the at least one barrier member extending in a direction away from the surface of the body into the separated flow region but not into the smooth flow region. The structure according to the present invention, having the suppressed separation of fluid flow, includes at least one barrier member provided on the surface of the body, this at least one barrier member extending in a direction away from the surface of the body into the separated flow region of fluid flow along the surface of the body, but not into the smooth flow region.

By providing the at least one barrier member according to the present invention, separation of fluid flow is suppressed, to avoid movement upstream of separation points where the separated flow region begins.

Various techniques can be used to provide this barrier to upstream propagation of disturbances. Illustrative techniques, which are not to be limiting, for providing the barriers, are shown in FIGS. 4(a)–(d), and each uses a barrier member (tab) 19. Thus, one way to create a barrier is by deploying outwardly a barrier member 19 as shown in FIG. 4(a), extending outwardly from surface 1. Barrier member 19 can be originally mounted flush on the surface adjacent to which the fluid flows. When the flow over the barrier member is separated, the barrier member 19 is deployed by rotating it about its leading edge 21 (with respect to fluid flow direction), in the direction of arrow 27, as shown in FIG. 4(a). The area underneath the deployed barrier member acts as chamber 25, that provides a place for the "trapped" vortices to settle down, so that the energy associated with these vortices are dissipated.

If needed, a true chamber 25a could already be present underneath barrier member 19 in its undeployed position, so that a larger settling area is created when the barrier member 19 is deployed. This is shown in FIG. 4(b).

Another variation is to rotate barrier member 19 about its center point 33, so that the front half 20a (with respect to the fluid flow direction) is deflected inward and the rear half 20b is deflected outward, as shown in FIG. 4(c). Another variation is to have the barrier member 19 slide out vertically in the direction of arrow 29, as shown in FIG. 4(d). The number of tabs or other barrier members, the size of the tabs or other barrier members, the size of the gaps between the tabs or other barrier members, as well as the deployment angle of the tabs or other barrier members, may be varied according to the particular needs in each case.

In each of FIGS. 4(a)–4(d), when barrier member 19 is not extending away from surface 1 (that is, when barrier member 19 is not deployed), it can be co-planar with surface 1. For example, in each of FIGS. 4(a)–4(c), when barrier member 19 is not deployed the upper, long surface of the barrier member can be flush or co-planar with surface 1. In FIG. 4(d), the upper edge of barrier member 19, when barrier member 19 is in an undeployed or retracted position, can be flush or co-planar with surface 1.

Figure 20:
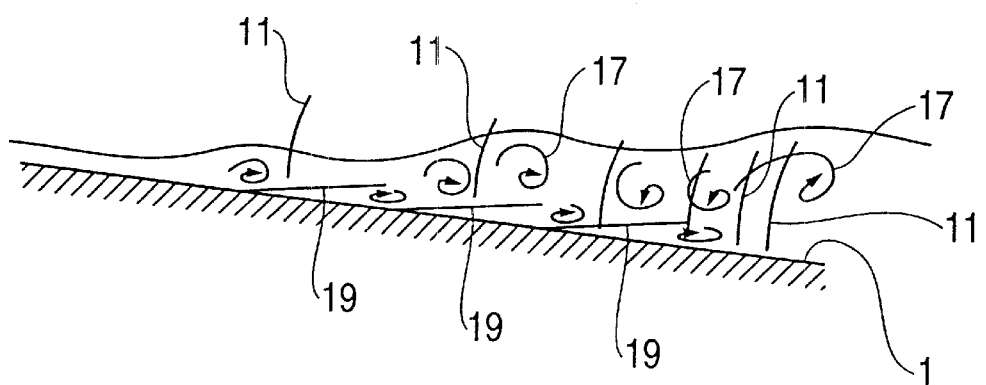
FIG. 20 illustrates restricted disturbance propagation on a surface with a plurality of barrier members extending away from a surface of a body during flow along the surface of the body according to an illustrative embodiment of the present invention.

An example of a multi-tab configuration is shown schematically in FIG. 5, and shown with more detail (with respect to fluid flow) in FIG. 20. FIG. 5 shows, schematically, a plurality of barrier members 19a, 19b and 19c, on surface 1 of a body along which a fluid flows in the direction of arrow 35. Barrier member 19b is longer than barrier member 19a, and barrier member 19c is longer than barrier member 19b. As can be seen in FIG. 5, the barrier members are spaced from each other in the direction along the flow of fluid as represented by arrow 35.

FIG. 20 shows how a plurality of barrier members 19 can suppress the separation of fluid flow. As seen in FIG. 20, at the right-hand side of the figure disturbance waves 11 are generated and eddies 17 are formed. Forming of the eddies 17, and propagation of disturbance waves 11 and influence of the disturbance waves 11, are restricted at each of barrier members 19, thereby suppressing the separation of fluid flow, beyond the suppressing that would occur if only a single barrier member 19 were provided. Variations can also be made to the dimension and shape of the chambers underneath the barrier member, in this multiple barrier member configuration.

On surfaces that are constantly exposed to separated flows, the tabs can be used as fixed devices, such as in the case of flows over sharp corners 39 as shown in FIGS. 6(a) and 6(b). In FIG. 6(a), surface 1 of the body has sharp corner 39 (for example, a right angle). Flow is in the direction of arrow 41, in each of FIGS. 6(a) and 6(b). Through use of the barrier members extending from surface 43 in each of FIGS. 6(a) and 6(b), flow separation is suppressed. The barrier member structure in FIG. 6(a) includes two barrier members 19c and 19d, extending from substantially a same point on surface 43 and being of different lengths and extending at different angles from the surface. Shown in FIG. 6(b) are relatively short barrier member 19e and relatively long barrier member 19f, extending parallel to each other away from surface 43 of the body. Note that the shorter tab is closer to the sharp corner 39. Through use of the barrier member structure as in FIG. 6(a) and FIG. 6(b), production of eddies 17 is reduced and separation of fluid flow is suppressed.

The effectiveness of the barrier member, such as a tab, has been confirmed in suppressing flow separation on the surface of a circular cylinder. The flow around a circular cylinder has been one of the most challenging in fluid dynamics. Not only is the flow separation severe; but also the wake forms the Karman vortex street, a series of vortices that fluctuate at a certain frequency as each vortex is shed downstream. This is shown in FIG. 7 having cylinder 51, with fluid flow in the direction of arrow 53, and with vortices 55, 55, etc. being formed at the rear side of cylinder 51. The existence of this vortex street poses a countless number of practical problems, some of which can lead to the destruction of the cylindrical body. Therefore, the control of the flow separation and resulting flow oscillation is of particular importance.

Figure 8:
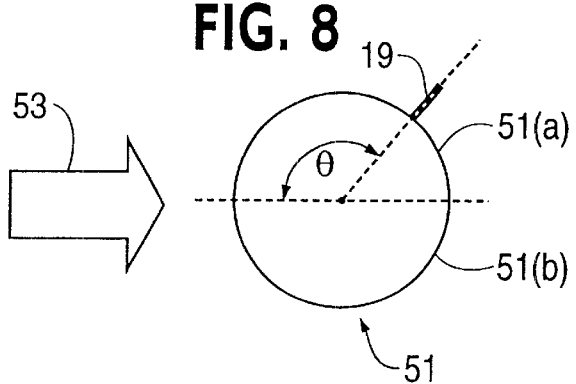
FIG. 8 illustrates use of a barrier member on the surface of a cylinder, for showing benefits achieved according to the present invention.
Figure 9:
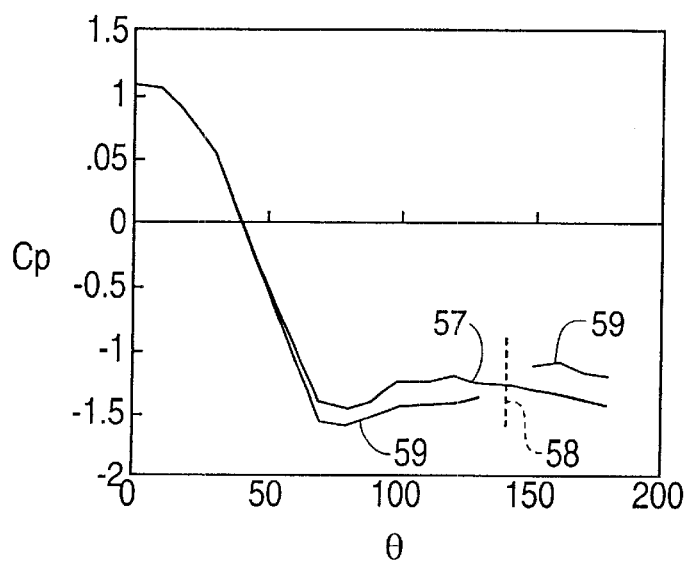
FIG. 9 is a graph showing pressure coefficient (Cp) distribution on the surface of a cylinder as a function of θ, θ being an angle as shown in FIG. 8.

The effectiveness of a tab in delaying separation, is illustrated using a single tab only on the upper surface 51(a) of cylinder 51 having upper and lower surfaces 51(a) and 51(b) respectively at θ=140°, the angle θ being defined in FIG. 8. FIG. 9 shows the pressure coefficient (Cp) distribution on the surface of the cylinder taken at a flow speed of 6/10 of the speed of sound (Mach 0.6). The length of the tab is 20% of the cylinder diameter. In FIG. 9, the curve represented by reference character 57 shows results from a cylinder not having any tab, and curve 59,59 shows results from a cylinder with tab at angle θ=140°, which is the situation shown in FIG. 8. From FIG. 9, it can be easily seen that flow in front and behind the tab is decoupled, the tab location being shown by reference character 58, suggesting that the information feed-back between the downstream and the upstream flow is, at least partially, cut off. As a result, the upstream flow can accelerate further to attain more negative pressures and the (time-averaged) separation point is delayed. The presence of the tab actually creates a lifting force on the cylinder. This effect is similar to the lifting effect created by rotating the cylinder about its axis (Magnus effect).

Figure 10:
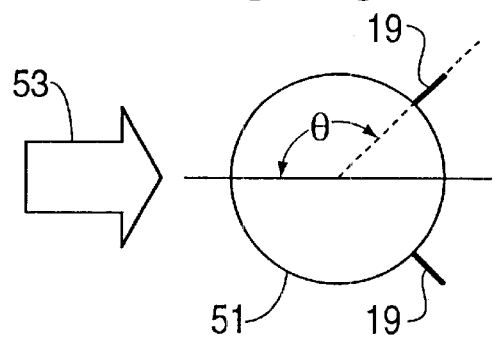
FIG. 10 illustrates another embodiment of the present invention utilizing a plurality of barrier members in connection with a cylindrical flow surface having a plurality of tabs on the flow surface.
Figure 11:
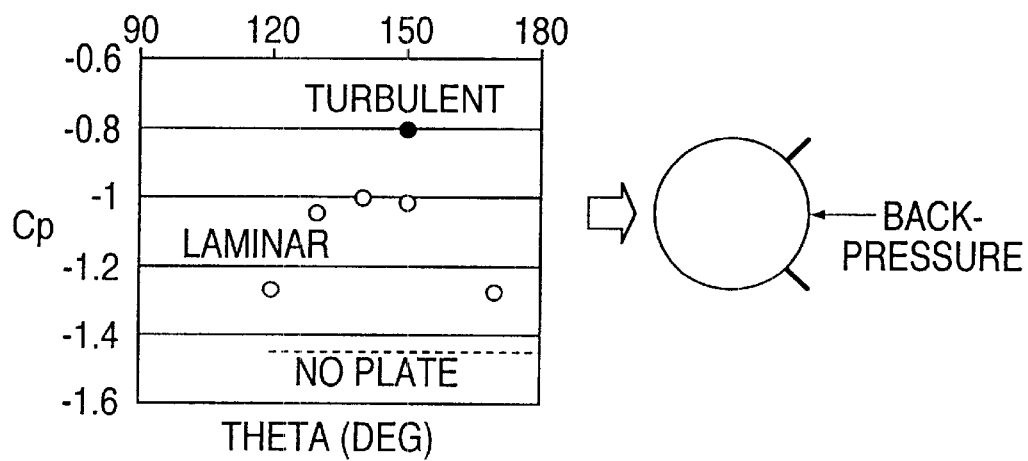
FIG. 11 is a graph of the base pressure coefficient (Cp) as a function of the tab position located at an angle θ, θ being shown in FIG. 10.

Since the flow separates also on the lower surfaces of the cylinder, the separation on the lower surface can also be controlled by installing another tab on the lower surface. The two tabs now are installed symmetrically opposed to each other, as shown schematically in FIG. 10. With this configuration, the pressure acting on the back of the cylinder (back pressure) is highest when the tabs are installed at about θ=140°, as shown in FIG. 11; this configuration provides an overall 15% reduction of pressure drag, which was calculated by integrating the pressure distribution over the cylinder surface. Furthermore, reduction in total drag has been observed as well. The effect of the tabs on the back pressure is larger (that is, back pressure is less negative) when the boundary layer on the surface of the cylinder is under a turbulent, as opposed to a laminar, condition.

Figure 12:
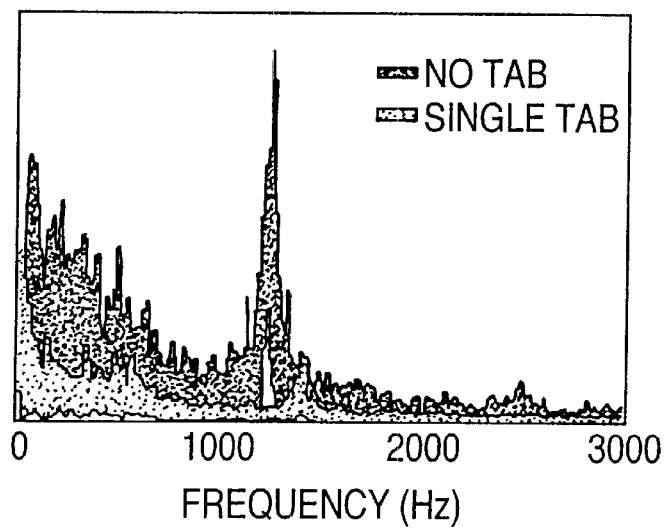
FIG. 12 is a graph showing the effect of tabs on flow oscillations.

The effect of the tabs on flow oscillations is illustrated in FIG. 12. This figure shows the frequency spectrum of the pressure data that is taken at θ=90°, with two tabs placed symmetrically opposed to each other at θ=130°. This is a case where the tabs protrude all the way across the separated region to reach the free-shear layer; that is, the viscous layer that divides the outer smooth flow and the inner separated flow. The peak on the figure is associated with the oscillation of the Karman vortex street. The presence of the tabs eliminates this peak, suggesting that flow information feedback through the (separated) boundary layer is completely cut off, causing the oscillation to be eliminated, or at least has become too weak to have any significant effects on the cylinder.

Figure 13:
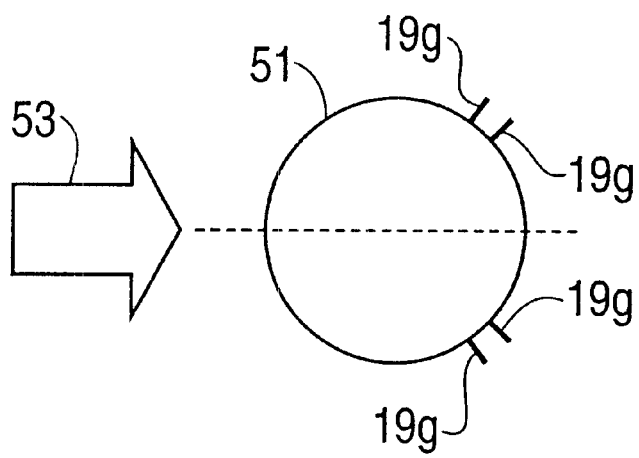
FIG. 13 illustrates another embodiment according to the present invention, where two shorter tabs are installed in succession on both the upper and lower surfaces of a cylinder as the body.
Figure 14:
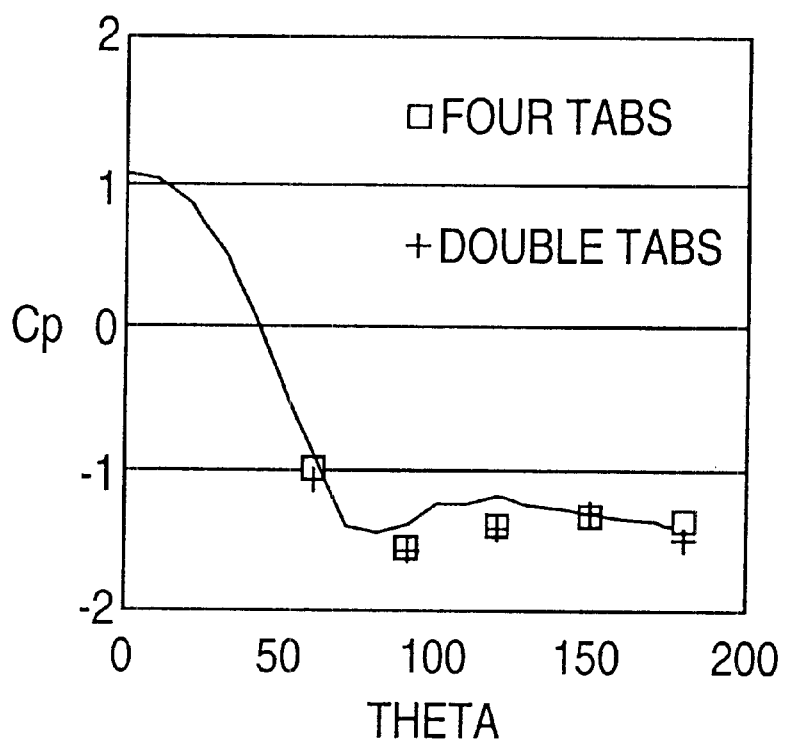
FIG. 14 illustrates the pressure distribution (Cp) over a cylinder surface for the embodiment shown in FIG. 13 having the two shorter tabs installed in succession on both upper and lower surfaces of the cylinder.

Another example is shown in FIG. 13, where two shorter tabs 19g, 19g (10% of the diameter of the cylinder) are installed in succession at θ=140° and 160° on both the upper and the lower surfaces of cylinder 51. In this case the tabs do not cut all the way across the separated region to reach the free shear layer, but penetrate only partially into the separated region. The pressure distribution over the cylinder surface is shown in FIG. 14. Also plotted on the figure is the data from the case where only one short tab is installed, at θ=130° on the upper and lower surfaces. Both configurations are effective in delaying separation, as indicated by the more negative pressure distribution between θ=90° and 150°.

Figure 15:
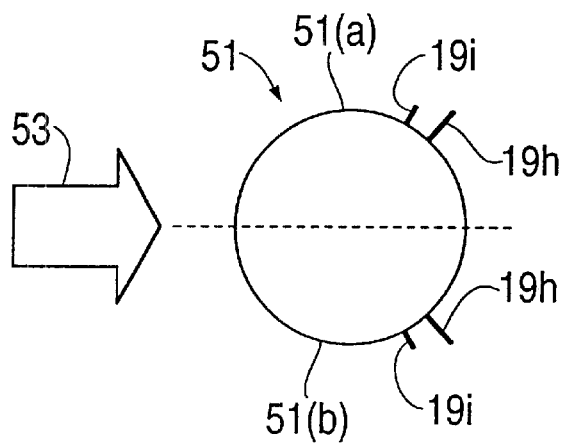
FIG. 15 illustrates another embodiment of the present invention having barrier members on a cylindrical surface, with two barrier members of different lengths being used.

Yet another example is shown in FIG. 15, where two tabs 19h, 19i of different lengths (10% and 20% of the diameter of the cylinder) are used. The shorter one is positioned at θ=120° and the longer one at θ=140°.

Figure 16:
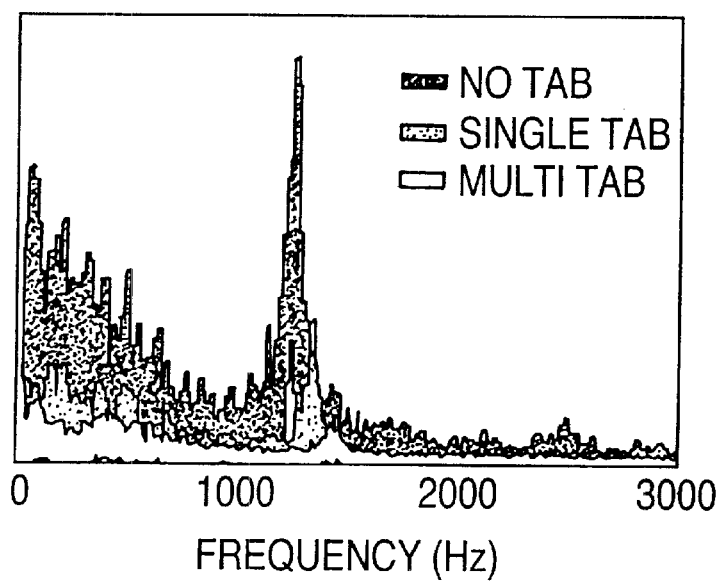
FIG. 16 illustrates advantages of use of a plurality of barrier members over a single barrier member configuration.

This configuration is especially effective in damping the flow oscillation around the cylinder. The benefit of this multi-tab configuration over the single tab configuration is demonstrated in FIG. 16, for pressure measurement at θ=90°. On this graph, the multi-tab case corresponds to the multi-tab configuration in FIG. 15, having more than one tab on each of the upper and lower surfaces 51(a) and 51(b), respectively; while the single tab configuration is the case where only a single 10% tab is present at θ=120° on each of the upper and lower surfaces 51(a) and 51(b), respectively. It is quite apparent from FIG. 16 that, during flow, oscillations are better suppressed by the multi-tab configuration. The level of suppression is even a little better than that yielded by the single 20% plate at θ=130° on upper and lower surfaces, whose result was shown in FIG. 12.

Figure 17A:
FIGS. 17(*a*)–17(*c*) are photographs of fluid flow around a cylinder model at Mach 0.6, with FIG. 17(*a*) showing flow using a basic cylinder with no barrier members, FIG. 17(*b*) being the case corresponding to a single barrier member configuration, and FIG. 17(*c*) being the case corresponding to structure having a plurality of barrier members.
Figure 17B:
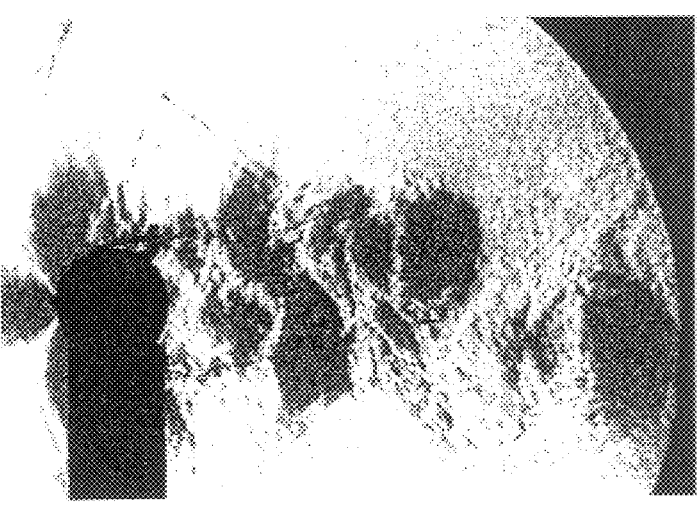
Figure 17C:
Figure 18A:
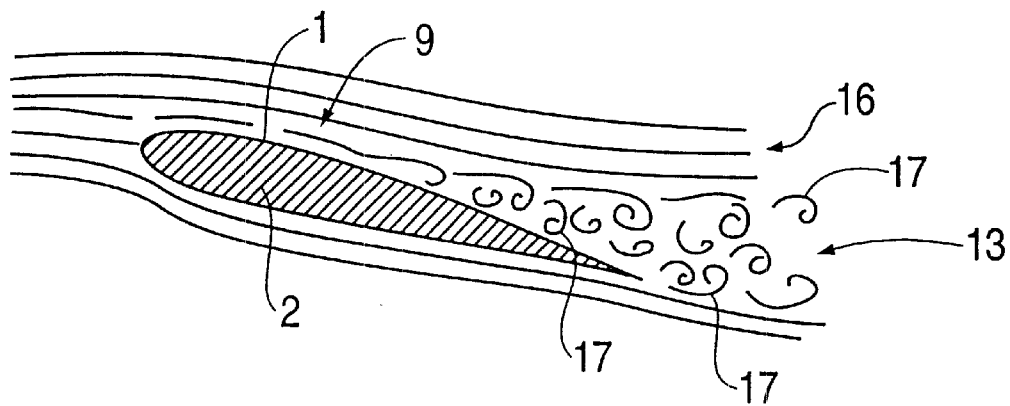
FIGS. 18(*a*) and 18(*b*) respectively illustrate separated external flow and separated internal flow, showing separated flow regions and smooth flow regions extending from a body surface during flow along the body surface.
Figure 18B:
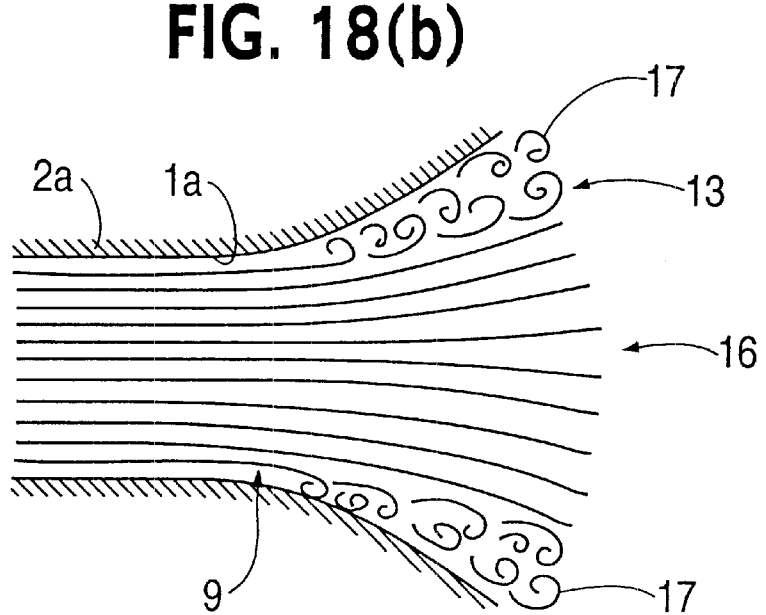
Figure 19A:
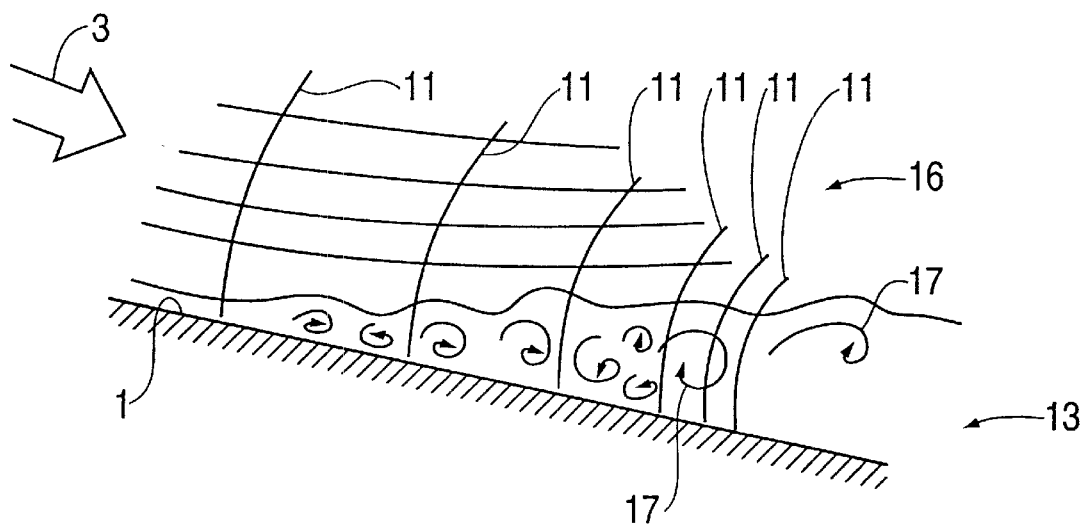
FIGS. 19(*a*) and 19(*b*) illustrate propagation upstream of a separated flow region and of a separation point, along a body surface, illustrating a problem addressed according to the present invention.
Figure 19B:
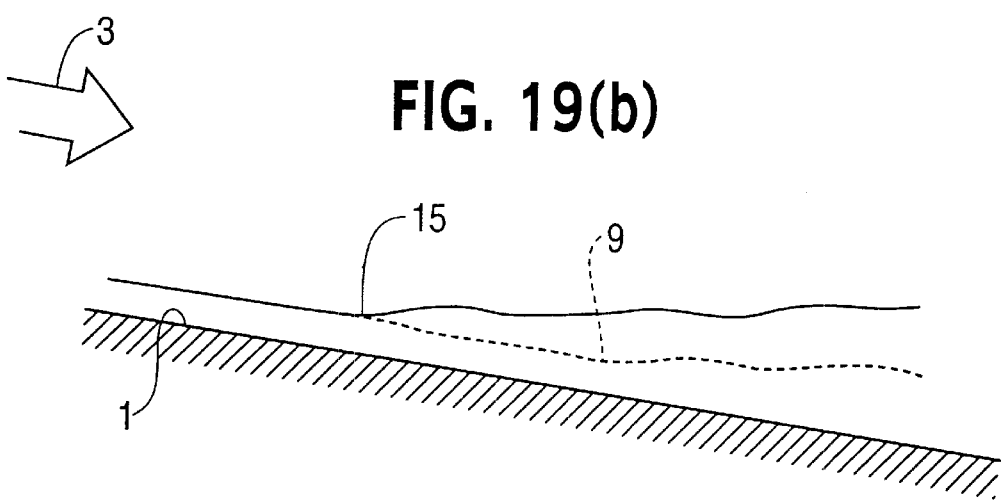

FIGS. 17(a) to 17(c) show photographs of flow around the cylinder model at Mach 0.6, taken with a flow visualization method known as the Schlieren method. FIGS. 17(a) is the case of the basic cylinder with no tabs, FIG. 17(b) is the case corresponding to the single-tab configuration similar to FIG. 10 with the tabs at θ=13°, and FIG. 17(c) is the case corresponding to the multi-tab configuration in FIG. 15. Flow of air is from the left to the right in each of the photographs. In each of FIGS. 17(a)–17(c), the cylinders are provided on a support (columnar), and are shown closer to the lefthand side of each photograph. As can be seen in the pictures, when tabs are inserted, vortex formation in the wake is pushed downstream and away from the model, which is most likely the main reason of the increase in the back pressure. The tabbed cylinders also noticeably produce narrower wakes than the no-tab cylinder, with the multi-tab case having the narrowest wake among the three cases. Moreover, the photographs also clearly show that the multi-tab configuration pushes the vortices farther downstream than the single-tab configuration.

In summary, depending on the size of the tabs, the number of tabs, and the distance between the tabs, the present invention has been proven to have the following effects:

delay of separation point to a more downstream location, which leads to a possible increase in lift in the case of fluid flowing along the exterior of an aerodynamic body;

reduction and possible elimination of flow oscillations or instabilities in the direct vicinity of the aerodynamic body;

if the body of interest is a bluff body (such as a cylinder), increase in back pressure which directly leads to decrease in pressure drag.

While we have shown and described several embodiments in accordance with the present invention, it is understood that the same is not limited thereto, but is susceptible of numerous changes and modifications as known to those of skill in the art. For example, various examples of the present invention have utilized a body having a cylindrical surface (e.g., a bluff body). However, the surface is not limited to a cylindrical surface, and the body can be a streamlined body or other shape, and can, e.g., be an airfoil such as an airplane wing. In addition, the surface of the body having the barrier members thereon can be an external surface or internal surface of the body. Where the surface is an internal surface, the body can, for example, be a diffuser. Therefore, I do not wish to be limited to the details shown and described herein, but intend to cover all such changes and modifications as are encompassed by the scope of the appended claims.

What is claimed is:

1. A method of suppressing separation of a fluid flow adjacent a surface of a body, during flow along the surface of the body, the method including:

providing the surface of the body with at least one barrier member, wherein, without said at least barrier member, the flow of the fluid includes, adjacent the surface of the body, in the direction of the flow of the fluid, an attached boundary layer flow region and a separated boundary layer flow region, and, spaced from the surface of the body, includes a smooth outer flow region, whereby the attached and separated boundary layer flow regions are between the surface of the body and the smooth outer flow region, and wherein each of the at least one barrier member extends in a direction away from the surface of the body into the separated boundary layer flow region but not into the smooth outer flow region.

2. The method according to claim 1, wherein the at least one barrier member acts to limit extent of upstream influences of disturbances that originate in the separated boundary layer flow region.

3. The method according to claim 1, wherein the at least one barrier member acts to reduce the onset of fluid flow separation.

4. The method according to claim 1, wherein the at least one barrier member acts to reduce the level of flow unsteadiness related to the fluid flow separation.

5. The method according to claim 1, wherein the at least one barrier member reduces the drag on the body.

6. The method according to claim 1, wherein the surface of the body is provided with a plurality of the barrier members, spaced from each other in the direction of flow of the fluid relative to the body, each of the plurality of barrier members extending into the separated boundary layer flow region but not into the smooth outer flow region.

7. The method according to claim 1, wherein the surface of the body is an external surface of the body.

8. The method according to claim 7, wherein the body is a streamlined body.

9. The method according to claim 7, wherein the body is a bluff body.

10. The method according to claim 1, wherein the surface of the body is an internal surface of the body.

11. The method according to claim 10, wherein the body is a diffuser.

12. The method according to claim 1, wherein the at least one barrier member is at least one movable tab, the at least one movable tab is initially embedded within the surface of the body, and when the separated boundary layer flow region is propagated over the at least one movable tab, the at least one movable tab is controllably extended outwardly into the separated boundary layer flow region but not into the smooth outer flow region.

13. The method according to claim 12, wherein the at least one movable tab is provided in at least one chamber, the at least one chamber being exposed to the flow when the at least one movable tab is controllably extended outwardly into the separated boundary layer flow region but not into the smooth outer flow region.

14. Structure having suppressed separation of fluid flow adjacent a surface of a body, during flow of a fluid along the surface of the body, the structure comprising:

the body, having the surface along which fluid flows during relative movement between the fluid and the body; and at least one barrier member provided on the surface of the body, wherein, without said at least one barrier member, the flow of the fluid includes, adjacent the surface of the body, in the direction of the flow of the fluid, an attached boundary layer flow region and a separated boundary layer flow region, and, spaced from the surface of the body, includes a smooth outer flow region, whereby the attached and separated boundary layer flow regions are between the surface of the body and the smooth outer flow region, and wherein each of the at least one barrier member extends in a direction away from the surface of the body into the separated boundary layer flow region but not into the smooth outer flow region.

15. Structure according to claim 14, wherein the at least one barrier member includes at least one controllably movable barrier member having at least two positions, a first position where the at least one controllably movable barrier member is substantially co-planar with the surface of the body and a second position where the at least one controllably movable barrier member extends in the direction away from the surface of the body into the separated boundary layer flow region but not into the smooth outer flow region.

16. Structure accordant to claim 15, wherein the structure includes at least one chamber extending into the body from the surface of the body, the at least one chamber being exposed to the flow of the fluid when the at least one barrier member extends in the direction away from the surface of the body into the separated boundary layer flow region.

17. Structure according to claim 14, having a plurality of the barrier members, the plurality of the barrier members being spaced from each other in the direction of flow of the fluid relative to the body.

18. Structure according to claim 17, wherein, in the direction of flow of the fluid relative to the body, each succeeding barrier member, of the plurality of barrier members, is longer than the preceding barrier member, of the plurality of barrier members.

* * * * *